Feb. 3, 1942.  R. K. LOTZ  2,271,562
CAMERA SHUTTER
Filed Jan. 24, 1940  2 Sheets-Sheet 1
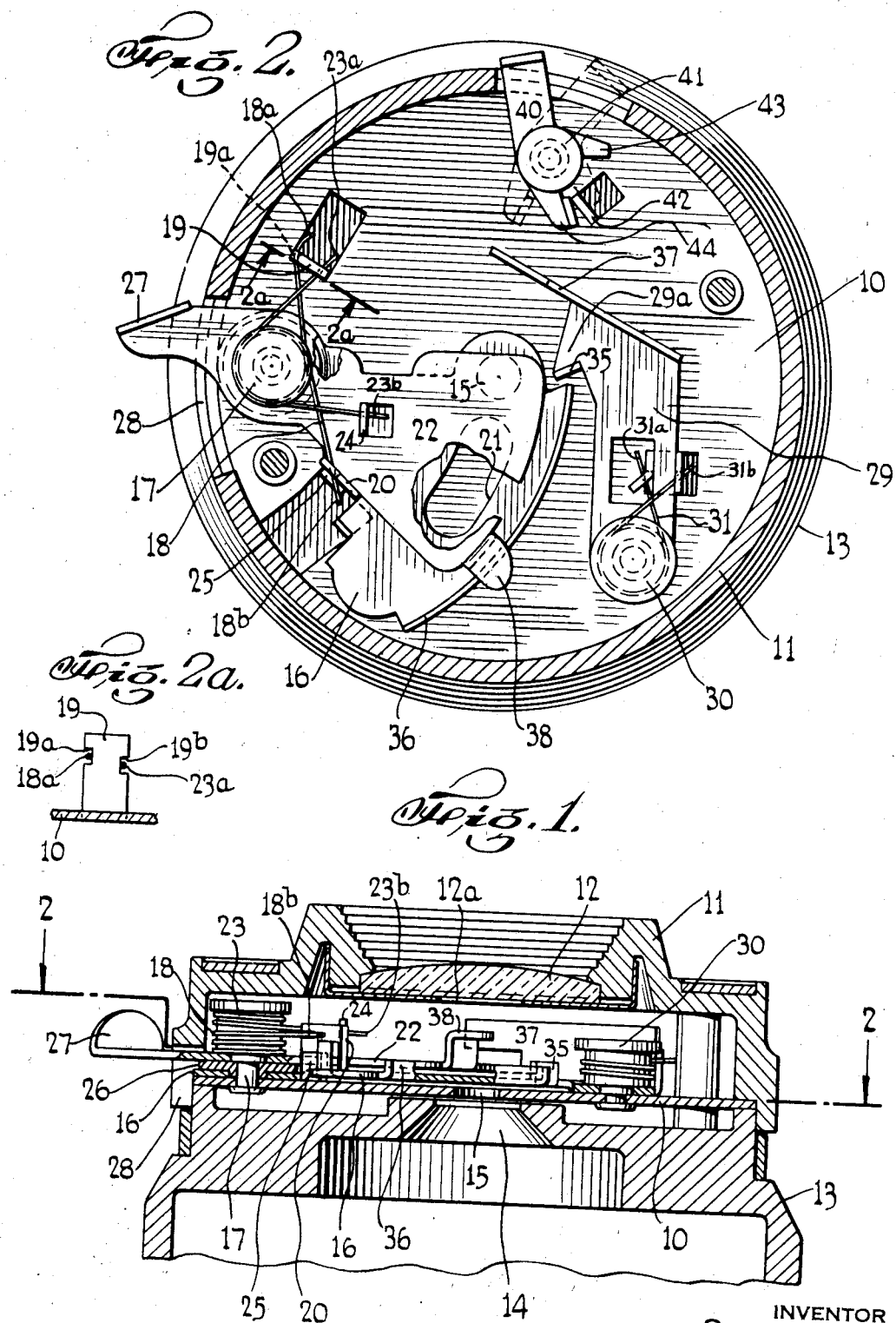
INVENTOR
RICHARD K. LOTZ
BY
ATTORNEY Feb. 3, 1942.  R. K. LOTZ  2,271,562
CAMERA SHUTTER
Filed Jan. 24, 1940  2 Sheets-Sheet 2
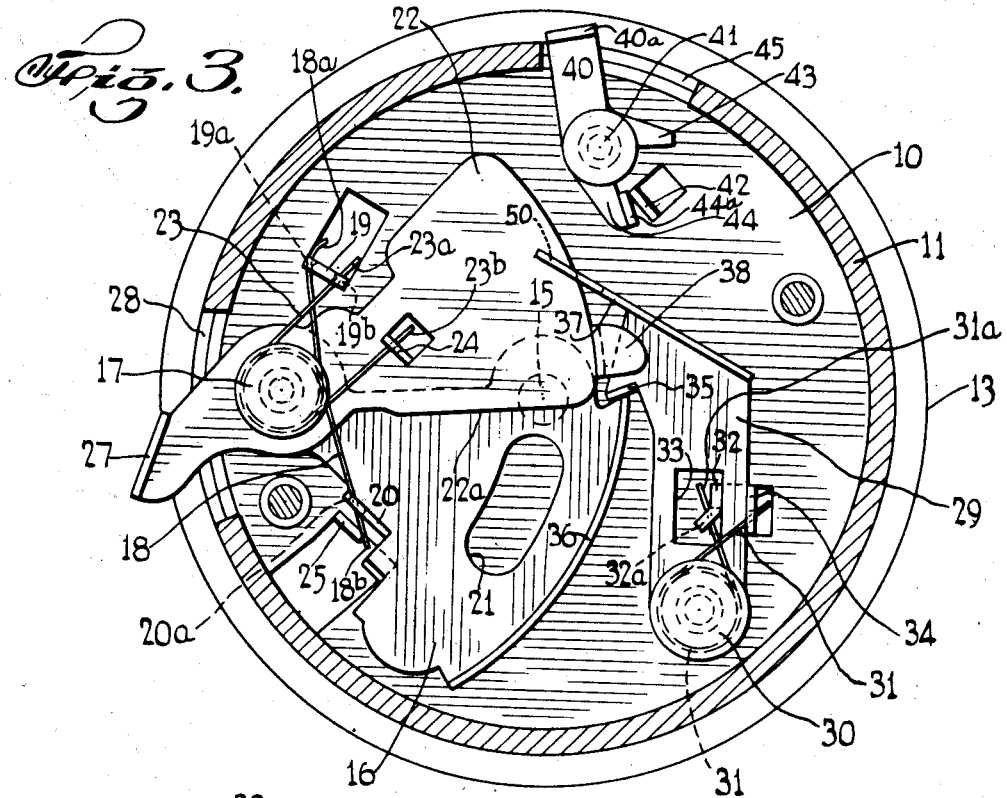
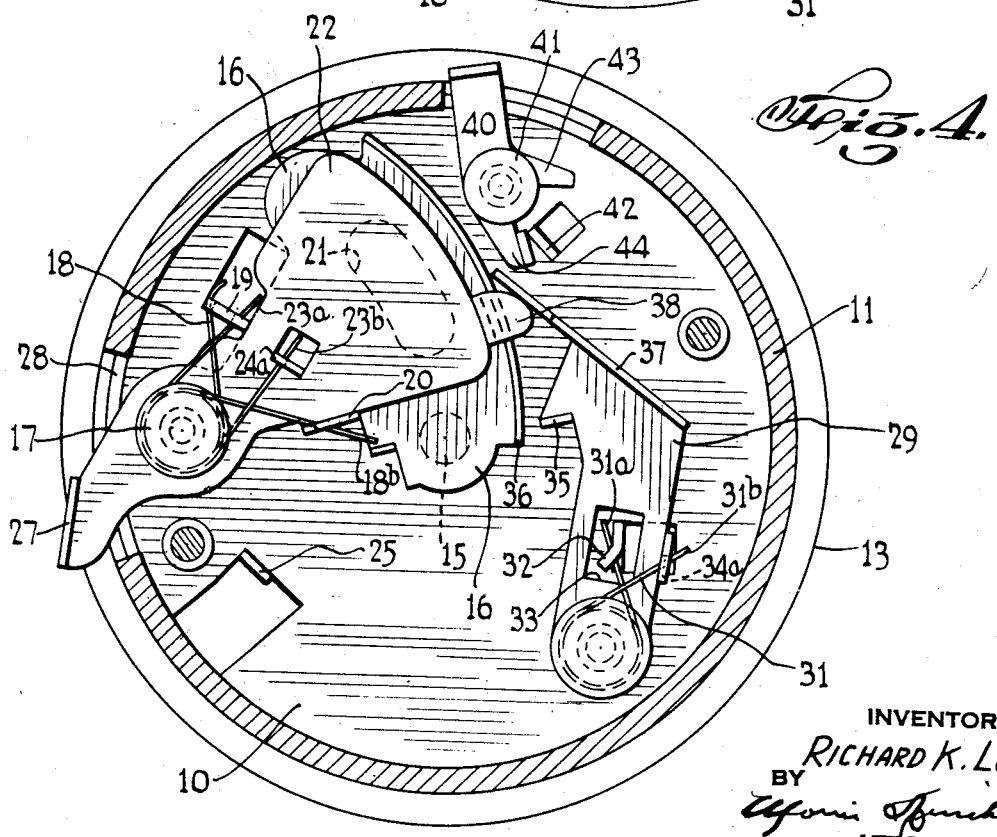
INVENTOR
RICHARD K. LOTZ
BY
ATTORNEY Patented Feb. 3, 1942

2,271,562

UNITED STATES PATENT OFFICE 2,271,562

CAMERA SHUTTER

Richard K. Lotz, Brooklyn, N. Y., assignor to Universal Camera Corporation, New York, N. Y., a corporation of Delaware Application January 24, 1940, Serial No. 315,291

14 Claims. (Cl. 95—60)

This invention relates generally to camera shutters. More particularly, my invention relates to a novel construction for camera shutters of the simple self-capping type adapted for use on inexpensive cameras.

One of the objects of my invention is to provide a novel shutter construction of the character described, adapted to be operated by a release lever, in which the time of exposure of the shutter blade is substantially independent of the rapidity with which the release lever is depressed.

Another object of my invention is to provide a camera shutter construction of the character described, adapted to be operated by a release lever, and in which a spring actuated shutter blade is employed, which shall be provided with means whereby when the release lever is pressed, energy will be stored in the spring until the tripping position is reached.

Still another object of my invention is to provide a novel and improved shutter which shall be characterized by its simplicity, which shall possess certain novel features of construction and which at the same time shall operate with a high degree of efficiency.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawings, in which is shown one of the various possible embodiments of this invention:

Fig. 1 is a transverse sectional view of a camera shutter housing containing a shutter constructed in accordance with my invention;

Fig. 2 is a cross-sectional view taken substantially on the line 2—2 of Fig. 1;

Fig. 2a is a cross-sectional view taken substantially on the line 2a—2a of Fig. 2; and Figs. 3 and 4 are cross-sectional views similar to Fig. 2 but showing the shutter parts in different stages of operation.

Referring now in detail to the drawings, I have shown a camera shutter device constructed in accordance with my invention and comprising a base plate 10 mounted in a shutter housing, the said housing comprising the part 11 having a lens aperture 12a of any suitable design and supporting a lens 12, and the part 13 provided with a light aperture 14 in optical alignment with the lens 12 and lens aperture 12a. The base plate 10 is provided with an aperture 15 in optical alignment with the apertures 12a and 14.

An exposure blade 16 is provided which is freely pivotally mounted on a stationary pivot member 17, fixed to the base plate 10. The exposure blade 16 is normally maintained in a position so that the aperture 15 is completely covered thereby, as shown in Fig. 2. A wire spring 18 is provided, which is wound around the shank of the pivot 17, leaving both ends 18a and 18b free. The spring end 18a is resiliently received in the notch 19a of a projection 19 extending upwardly from the base plate 10 (see Fig. 2a), while the spring end 18b is resiliently received in the notch 20a of a projection 20 extending upwardly from the exposure blade 16. The notch 20 is similar to the notch 19a. If desired, the projection 19 may be struck out from the material of the base plate 10, and the projection 20 may be integral with and bent up from an edge of the exposure blade 16, as shown. The spring 18a is so wound around the pivot 17 in such direction that it will exert its force against the fixed projection 19 attached to the base plate 10. Therefore, the effective resilient force of the spring 18 will cause the end 18b to normally urge the rotational movement of the exposure blade 16 in a counterclockwise direction about the pivot 17. The exposure blade 16 is provided with an arcuate slot 21, so positioned and of such size as to uncover the aperture 15 during a predetermined period of the travel of said exposure blade 16.

The following means are provided for normally rendering ineffective the normal tendency of the exposure blade 16 to travel in a counterclockwise direction about the pivot 17 as viewed in Figs. 2 to 4 of the drawings. Freely rotatably mounted on the fixed pivot 17, in a plane parallel to and in superimposed relationship with respect to the exposure blade 16, is a manually operatable mask blade 22. A second wire spring 23 is provided which is wound around the pivot 17, leaving the ends 23a and 23b free. The spring end 23a is resiliently received in a second notch 19b in the fixed projection 19 (see Fig. 2a), while the spring end 23b is resiliently received in a notch 24a of a projection 24 extending upwardly from the mask blade 22, the said notch 24a being similar to the notches 19a and 19b. The said projection 24 may be struck out from the material of the mask blade 22, as shown. The spring 23 is wound around the pivot 17 in an opposite direction from that of the spring 18 and, therefore, the effective resilient force of the said spring 23 will normally urge the pivotal movement of the mask blade 22 in a clockwise direction about the pivot 17. The spring 23 is designed to be stronger than the spring 18, with the result that the trailing edge 22a of the mask blade 22 will contact the projection 20 on the exposure blade 16 to urge the said blade 16 to travel in a clockwise direction with the blade 22 and against the normal action of the spring 18. A projection 25 on the base plate 10, which may be struck out therefrom, serves to limit the pivotal movement of both blades 16 and 22 in such clockwise direction, and they will come to rest in the position shown in Fig. 2. In such last named position it is noted that the exposure blade 16 covers the aperture 15 and the mask blade 22 overlies the blade 16 and also covers the slot 21.

To prevent frictional contact between the adjacently disposed flat surfaces of the blade 16 and 22 during movement, a separating bearing member 26 fixed to the pivot 17 is interposed between the blades 16 and 22, as clearly shown in Fig. 1 of the drawings.

To facilitate the manual operation of the shutter from the outside of the camera, I have provided the mask blade 22 with an operating tab 27 projecting through an opening 28 in the shutter housing to the outside thereof.

It is thus seen from the above described construction that when the mask blade 22 is manually rotated in a counter-clockwise direction against the action of the spring 23, the exposure blade 16 will be free to travel in the same direction, due to the normal action of the spring 18, and when downward pressure on the tab 27 of the mask blade 22 is released, the spring 23, being stronger than the spring 18, will restore both blades to their original position against the abutment 25, as shown in Fig. 2. It is noted that if the blades 16 and 22 were thus permitted to travel together at all times, the aperture 15 would remain constantly covered and the camera would take no picture. Therefore, in accordance with my invention, I have provided the following means for exposing the aperture 15 during a predetermined period of travel of the blades 16 and 22.

A locking pawl 29 is provided which is freely pivotally mounted on a pivot member 30 fixed to the base plate 10. A wire spring member 31 is wound around the shank of the pivot 30, leaving the ends 31a and 31b free. The spring end 31a is resiliently received in a notch 32a in the projection 32, the said projection extending upwardly from the base plate 10 and passing freely through an opening 33 in the pawl 29. The spring end 31b is resiliently received in a notch 34a of a projection 34 extending upwardly from an edge of the pawl 29 to normally urge the counter-clockwise rotational movement of the pawl 29 about the pivot 30. The said counter-clockwise rotational movement of the pawl 29 is limited by a wall of the opening 33 and the pawl 29 normally assumes the position shown in Figs. 2 and 3. The pawl 29 is provided with an extending portion 29a disposed in the path of movement of the exposure blade 16 and at the same time out of the path of movement of the mask blade 22. The pawl portion 29a is provided with an upwardly extending projection 35 designed to contactively engage a raised peripheral ridge 36 on the blade 16. The pawl 29 is further provided with an upstanding wall 37 angularly disposed as shown, to serve as a cam member to cause the pawl 29 to rotate about the pivot 30 in a clockwise direction against the action of the spring 31 when cooperatively engaged by a finger portion 38 of the blade 22. The said finger 38 may be offset from the plane of the body of the blade 22 to clear the ridge 36 and the projection 35.

The operation of my improved shutter to operatively expose the film will now be described.

In Fig. 2 of the drawings the shutter device is shown in its normally inactive position with the aperture 15 covered. When the shutter operating tab 27 is pressed downwardly, the mask blade is caused to rotate in a counter-clockwise direction against the action of the spring 23. As the trailing edge 22a of the blade 22 moves away from the projection 20, the exposure blade 16 will also tend to rotate in a counter-clockwise direction, due to the action of the spring 18. However, as shown in Fig. 3, the exposure blade 16 will travel only a slight distance when the ridge 36 thereof will encounter the projection 35 of the pawl 29, with the result that further rotation of the exposure blade 16 will be prevented while permitting continued rotation of the blade 22, as clearly shown in Fig. 3. In this last named position of the blades 16 and 22, it is noted that the aperture 15 is still covered. Upon continued downward pressure on the tab 27 to rotate the blade 22, the finger 38 thereof will contactively engage the cammed wall 37 to rotate the said pawl in a clockwise direction resulting in the movement of the projection 35 out of the path of the ridge 36. This will permit the exposure blade 16 to quickly travel in a counter-clockwise direction with the full force of the spring 18. The finger 38 is so positioned that when it strikes the cammed wall 37 to move the pawl 29 out of the way of the blade 16, the trailing edge 22a of the blade 22 will have moved past the aperture 15, so that the said aperture 15 will be exposed during the time when the slot 21 of the blade 16 passes thereover. It is also noted that no matter how fast or slow the tab 27 is pressed or with what force, the time of exposure of the aperture will always be the same.

Upon release of the tab 27, both blades 16 and 22 will be restored to their original position, as shown in Fig. 2, due to the action of the stronger spring 23.

A portion of the cammed wall 37 is provided with a notch 50 to permit the leading portion of the blade 22 to freely pass therethrough.

The above described operation of my novel shutter was in connection with its use for taking instantaneous snapshots. However, in accordance with my invention I have also provided the following means for adapting my shutter for the taking of bulb exposures.

Pivotally mounted on the base plate 10 by means of a fixed pivot 41 is a lever 40 having a tab portion 40a thereof extending through an opening 45 in the shutter housing. The lever 40 is provided with a pair of projecting fingers 43 and 44 spaced apart a predetermined distance. An abutment member 42 is disposed between the fingers 43 and 44 and in the path of movement thereof. The abutment 42 may be of any suitable form such as, for example, an upwardly projecting portion of the base plate 10 which is struck out therefrom, as shown. The finger 44 may also be provided with an upwardly extending lip 44a, the purpose of which will soon become apparent.

It is thus seen that the rotational movement of the lever 40 is limited in a clockwise direction by the finger 43, and in a counter-clockwise direction by the finger 44. The positioning of the abutment 42 with respect to the fingers 43 and 44 is such that in the limit of counter-clockwise movement of the lever 40, the finger 44 will be out of the path of movement of the blades 16 and 22, as shown in Figs. 3 and 4 and in full lines in Fig. 2. In such position the camera is set for taking instantaneous snapshots as hereinbefore described. However, when it is desired to take a bulb exposure, the lever 40 is rotated in a clockwise direction until the finger 43 encounters the abutment 42 at which time the lever 40 will be in its dotted line position shown in Fig. 2. In such position, the finger 44 will be disposed in the path of movement of the blade 16 so that when the tab 27 is depressed to cause the operation of the shutter as hereinbefore described, the ridge 36 of the blade 16 will strike the lip 44a of the finger 44 and prevent further rotational movement thereof. In such last named position, the slot 21 will be over the aperture 15 to expose the said aperture 15. The blade 22 is so arranged with respect to the finger 44 when it is moved to the end of its stroke, as shown in Fig. 4, it will uncover both the slot 21 and the aperture 15. The shutter may be held in such last named exposed position by keeping the tab 27 pressed downwardly for any desired length of time after which, upon release of the pressure on the tab 27, the shutter will be restored to its original position, thus closing off the aperture 15.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

It will be apparent that my novel shutter will function satisfactorily regardless of what stationary member the projection 19 is fixedly mounted on. In the appended claims it is therefore to be understood that the term "anchored to said shutter plate" connotes attachment of one end of each of the springs 18 or 23 to any stationary camera member.

Having thus described my invention, I claim as new and desire to secure by Letters Patent:

1. In a camera shutter of the character described, the combination of an apertured shutter plate, a pair of shutter blades rotatably mounted on said plate, spring means for normally urging one of said shutter blades to rotate in one direction, spring means for normally urging the other of said shutter blades to rotate in the opposite direction, one of said spring means being stronger than the other to normally urge both blades to rotate in the same direction against the action of the weaker spring means, each of said spring means having one end thereof anchored to said shutter plate, means for preventing rotational movement of the shutter blade, urged in one direction by the weaker of said spring means, during a predetermined period of movement of the other of said blades, means for rendering said last named means ineffective when said other blade has traveled beyond said predetermined period of movement, and manually manipulatable means for rotating said other blade.

2. In a camera shutter of the character described, the combination of an apertured shutter plate, a pair of shutter blades rotatably mounted on said plate, spring means for normally urging one of said shutter blades to rotate in one direction, spring means for normally urging the other of said shutter blades to rotate in the opposite direction, one of said spring means being stronger than the other to normally urge both blades to rotate in the same direction against the action of the weaker spring means, an abutment on the blade actuated by said weaker spring means adapted to be contactively engaged by the blade actuated by the stronger spring means to normally position both blades so as to cover said plate aperture, each of said spring means having one end thereof anchored to said shutter plate, means for preventing rotational movement of the shutter blade, urged in one direction by the weaker of said spring means, during a predetermined period of movement of the other of said blades, means for rendering said last named means ineffective when said other blade has traveled beyond said predetermined period of movement, and manually manipulatable means for rotating said other blade.

3. In a camera shutter of the character described, the combination of an apertured shutter plate, a pair of shutter blades rotatably mounted on said plate, spring means for normally urging one of said shutter blades to rotate in one direction, spring means for normally urging the other of said shutter blades to rotate in the opposite direction, one of said spring means being stronger than the other to normally urge both blades to rotate in the same direction against the action of the weaker spring means, means for preventing the rotational movement of one of said blades during a predetermined period of movement of the other of said blades, means for rendering said last named means ineffective when said other blade has traveled beyond said predetermined period of movement, each of said spring means having one end thereof anchored to said shutter plate, and manually manipulatable means for rotating said other blade.

4. In a camera shutter of the character described, the combination of an apertured shutter plate, a pair of shutter blades rotatably mounted on said plate, spring means for normally urging one of said shutter blades to rotate in one direction, spring means for normally urging the other of said shutter blades to rotate in the opposite direction, one of said spring means being stronger than the other to normally urge both blades to rotate in the same direction against the action of the weaker spring means, an abutment on the blade actuated by said weaker spring means adapted to be contactively engaged by the blade actuated by the stronger spring means to normally position both blades so as to cover said plate aperture, manually manipulatable means for rotating the blade actuated by said stronger spring means in a direction against the action of said stronger spring means, each of said spring means having one end thereof anchored to said shutter plate, means for preventing rotational movement of the shutter blade, urged in one direction by the weaker of said spring means, during a predetermined period of movement of the other of said blades, and means for rendering said last named means ineffective when said other blade has traveled beyond said predetermined period of movement.

5. In a camera shutter of the character described, the combination of an apertured shutter plate, a pair of shutter blades rotatably mounted on said plate, spring means for normally urging one of said shutter blades to rotate in one direction, spring means for normally urging the other of said shutter blades to rotate in the opposite direction, one of said spring means being stronger than the other to normally urge both blades to rotate in the same direction against the action of the weaker spring means, means for preventing the rotational movement of one of said blades during a predetermined period of movement of the other of said blades, means for rendering said last named preventing means ineffective after such predetermined period, each of said spring means having one end thereof anchored to said shutter plate, and manually manipulatable means for rotating said other blade.

6. In a camera shutter of the character described, the combination of an apertured shutter plate, a pair of shutter blades rotatably mounted on said plate, spring means for normally urging one of said shutter blades to rotate in one direction, spring means for normally urging the other of said shutter blades to rotate in the opposite direction, one of said spring means being stronger than the other to normally urge both blades to rotate in the same direction against the action of the weaker spring means, means for preventing the rotational movement of one of said blades during a predetermined period of movement of the other of said blades, said last named means comprising a pawl member pivotally mounted on said plate, means to render said pawl ineffective when said other blade has traveled beyond said predetermined period of movement, each of said spring means having one end thereof anchored to said shutter plate, and manually manipulatable means for rotating said other blade.

7. In a camera shutter of the character described, the combination of an apertured shutter plate, a pair of shutter blades rotatably mounted on said plate, spring means for normally urging one of said shutter blades to rotate in one direction, spring means for normally urging the other of said shutter blades to rotate in the opposite direction, one of said spring means being stronger than the other to normally urge both blades to rotate in the same direction against the action of the weaker spring means, means for preventing the rotational movement of one of said blades during a predetermined period of movement of the other of said blades, said last named means comprising a pawl member pivotally mounted on said plate, spring means for urging the movement of said pawl in such direction as to normally lie in the path of movement of one of said blades, means to render said pawl ineffective when said other blade has traveled beyond said predetermined period of movement, each of said first two named spring means having one end thereof anchored to said shutter plate, and manually manipulatable means for rotating said other blade.

8. In a camera shutter of the character described, the combination of an apertured shutter plate, a pair of shutter blades rotatably mounted on said plate, spring means for normally urging one of said shutter blades to rotate in one direction, spring means for normally urging the other of said shutter blades to rotate in the opposite direction, one of said spring means being stronger than the other to normally urge both blades to rotate in the same direction against the action of the weaker spring means, means for preventing the rotational movement of one of said blades during a predetermined period of movement of the other of said blades, said last named means comprising a pawl member pivotally mounted on said plate, spring means for urging the movement of said pawl in such direction as to normally lie in the path of movement of one of said blades, means on the other of said blades to cause said pawl to move in a direction against the normal action of its spring means after said predetermined period of movement, each of said spring means having one end thereof anchored to said shutter plate, and manually manipulatable means for rotating said other blade.

9. In a camera shutter of the character described, the combination of an apertured shutter plate, a slotted shutter blade rotatably mounted on said plate, a mask shutter blade rotatably mounted on said plate, a spring for normally urging said mask blade to rotate in a clockwise direction, a spring for normally urging said slotted blade to rotate in a counter-clockwise direction, said mask blade spring being stronger than the other spring to normally urge both blades to rotate in the same direction against the action of the weaker spring, means for preventing the rotational movement of said slotted blade during a predetermined period of movement of the mask blade, said last named means comprising a pawl member pivotally mounted on said plate, said pawl member having a cammed wall portion, a spring for urging said pawl in a direction so as to normally lie in the path of movement of said slotted blade, a projecting portion of said mask blade cooperating with said cammed wall to rotate said pawl against the action of said spring to thereafter permit rotational movement of said held blade, one end of each of said springs having one end thereof anchored to said shutter plate, and manually manipulatable means for rotating said mask blade.

10. In a camera shutter of the character described, the combination of an apertured shutter plate, a pivot shaft on said plate, a pair of shutter blades rotatably mounted on said shaft, a pair of springs on said shaft, one of said springs being so arranged as to normally urge the movement of one of said blades in one direction, and the other of said springs being so arranged as to normally urge the movement of the other of said blades in an opposite direction, one of said springs being stronger than the other to cause both blades to rotate in the same direction against the action of the weaker spring, one end of each of said springs being anchored to said shutter plate, means for preventing the rotational movement of the shutter blade urged in one direction by the weaker of said springs during a predetermined period of movement of the other of said shutter blades, means to render said last named means ineffective when the other of said shutter blades has traveled past said predetermined period of movement and manually manipulatable means for rotating said other shutter blade.

11. In a camera shutter of the character described, the combination of an apertured shutter plate, a pivot shaft on said plate, a slotted shutter blade rotatably mounted on said shaft, a mask shutter blade rotatably mounted on said shaft, a first spring on said shaft arranged so as to normally urge the movement of said slotted blade in a counter-clockwise direction, a second spring on said shaft arranged so as to normally urge the movement of said mask blade in a clockwise direction, said second spring being stronger than said first spring to cause both blades to rotate in a clockwise direction, one end of each of said springs being anchored to said shutter plate, means for preventing the rotational movement of said slotted blade during a predetermined period of movement of said mask blade, means to render said last named means ineffective when said mask blade has traveled beyond said predetermined period of movement, and manually manipulatable means for rotating said mask blade.

12. In a camera shutter of the character described, the combination of an apertured shutter plate, a pivot shaft on said plate, a slotted shutter blade rotatably mounted on said shaft, a mask shutter blade rotatably mounted on said shaft, a first spring on said shaft arranged so as to normally urge the movement of said slotted blade in a counter-clockwise direction, a second spring on said shaft arranged so as to normally urge the movement of said mask blade in a clockwise direction, said second spring being stronger than said first spring to cause both blades to rotate in a clockwise direction, a second pivot shaft on said plate, a pawl member rotatably mounted on said second shaft, a spring on said second shaft arranged so as to normally urge the movement of said pawl in a counter-clockwise direction to normally position said pawl so as to prevent the counter-clockwise movement of said slotted blade, means associated with said mask blade to render said pawl ineffective, one end of each of said springs being anchored to said shutter plate, and manually manipulatable means for rotating said shutter blade.

13. In a camera shutter of the character described, the combination of an apertured shutter plate, a pivot shaft on said plate, a slotted shutter blade rotatably mounted on said shaft, a mask shutter blade rotatably mounted on said shaft, a first spring on said shaft arranged so as to normally urge the movement of said slotted blade in a counter-clockwise direction, a second spring on said shaft arranged so as to normally urge the movement of said mask blade in a clockwise direction, said second spring being stronger than said first spring to cause both blades to rotate in a clockwise direction, a second pivot shaft on said plate, a pawl member rotatably mounted on said second shaft, a spring on said second shaft arranged so as to normally urge the movement of said pawl in a counter-clockwise direction to normally position said pawl so as to prevent the counter-clockwise movement of said slotted blade, an extension on said mask blade adapted to move said pawl out of the path of movement of said slotted blade after a predetermined period of counter-clockwise movement of said mask blade, to thereby uncover said plate aperture, one end of each of said springs being anchored to said shutter plate, and manually manipulatable means for rotating said mask blade.

14. A camera shutter according to claim 9 in which a lever is rotatably mounted on said plate, said lever being adapted to be manually rotated to selectively position the same in the path of movement of said slotted blade to stop said slotted blade in a predetermined position, said predetermined position being such that the slot thereof will be over the plate aperture.

RICHARD K. LOTZ.